United States Patent [19]

Matsuda et al.

[11] Patent Number: 5,125,078
[45] Date of Patent: Jun. 23, 1992

[54] ELECTRONIC DISPLAY APPARATUS WITH SCROLLING FUNCTION

[75] Inventors: Eichika Matsuda, Yamatotakada; Toshiro Oba, Nara, both of Japan

[73] Assignee: Sharp Kabushiki Kaisha, Osaka, Japan

[21] Appl. No.: 315,811

[22] Filed: Feb. 27, 1989

[30] Foreign Application Priority Data

Feb. 26, 1988 [JP] Japan .................................. 63-44774

[51] Int. Cl.⁵ .............................................. G06F 3/14
[52] U.S. Cl. .................................. 395/275; 364/237.2; 364/927.2
[58] Field of Search ... 364/710, 709, 706, 200 MS File, 364/900 MS File

[56] References Cited

U.S. PATENT DOCUMENTS

| | | | |
|---|---|---|---|
| 3,760,171 | 9/1973 | Wang et al. | 364/200 |
| 4,117,512 | 9/1978 | Klausner et al. | 364/900 |
| 4,509,138 | 4/1985 | Hayashi et al. | 364/900 |
| 4,530,068 | 7/1985 | Nakanishi et al. | 364/900 |
| 4,692,760 | 9/1987 | Unno et al. | 340/756 |
| 4,751,668 | 6/1988 | Aihara | 364/900 |

FOREIGN PATENT DOCUMENTS

0264098 4/1988 European Pat. Off. .

Primary Examiner—David Y. Eng

[57] ABSTRACT

A portable electronic device provided with an input portion, an LCD having both dot matrix and segment display portions, a memory for storing input character and numerical information, a write/read portion performing write/read operations on character and numerical information for the memory, a buffer for temporarily storing information which has been previously read or written, a display control portion which outputs the character information in the buffer to the dot matrix display portion and the numerical information to the segment display portion, respectively, and a conversion portion which, when the numerical information exceeds the display digit number of the segment display portion, converts the numerical information contained in the segment display into dot matrix display data and transfers it to the dot matrix display portion for display, and at the same time, displays the numerical information which exceeds the display digit number on the segment display portion which has become an empty area due to the transfer.

4 Claims, 7 Drawing Sheets

Data Baffer

| SMITH ROBERT |
| 1 - 2 1 2 - 5 5 5 - 1 2 | ← 4bit |
| 2 2 | ← 4bit |

1 - 2 1 2 - 5 5 5 - 1 2
is Converted Into
8bit Data.

FIG. 7 (b)

Display Buffer

| 1 - 2 1 2 - 5 5 5 - 1 2 | ← 8bit |
| 2 2 | ← 4bit |

FIG. 7 (c)

Display Image Plane

ELECTRONIC DISPLAY APPARATUS WITH SCROLLING FUNCTION

BACKGROUND OF THE INVENTION

1. Field of the Invention

The present invention relates to an electronic device and more particularly to a small-sized electronic device such as an electronic memorandum, an autodialer or the like, which is capable of displaying various information as well as storing and recalling and character information and numerical information.

2. Description of the Prior Art

In a small-sized electronic device of this type, it is essential that both character information and numerical information be sometimes displayed simultaneously. It is well known that a dot matrix type display unit has been heretofore used to display numerical information and a segment type display unit has been heretofore used to display numerical information. However, in a conventional small-sized electronic device, a dot matrix type display unit consisting of, for example, 7×5 dot composition is generally used when both character information and numerical information are displayed, because the segment type display unit is not suitable for display of character information.

An example of a small-sized electronic device which is capable of storing character information and numerical information in the main body thereof is the "ELECTRONIC POCKET DIRECTORY" disclosed in U.S. Pat. No. 4,117,542.

Also, in such a small-sized electronic device, the area of display is generally limited, for example, to twelve digits in a dot matrix type display unit. Accordingly, when a telephone number (numerical information) which has an extended number of digits, is input or when a telephone number having an extended number which has been stored in the main body are accessed, there is the problem in that the telephone number overflows the display capacity. That is, when the telephone number is caused to scroll in one direction, the numeral at the head digit disappears from the display portion, thus it is difficult or impossible to input a telephone number or confirm whether the memory's contents had been input previously. Also, when a telephone number having extended digits is accessed, it is impossible to display in a list the whole of that telephone number using the display portion alone.

SUMMARY OF THE INVENTION

According to the present invention, there is provided an electronic device including an input device for inputting character information, numerical information and various instructions; storage for storing character and numerical information in a readable form; write/read mechanism for writing information from the input device to storage and for reading information from storage; a display including a dot matrix display portion and a segment display portion for collectively displaying character information in a predetermined character number and numerical information in a predetermined character number; temporary storage for storing temporarily the information which is output from the write/read mechanism; display control for converting the information output from temporary storage means into information for the dot matrix display and/or information for the segment display and outputting it to the display decision unit for outputting a signal when the numerical information stored in temporary storage exceeds a predetermined character number, and also for outputting a signal when the display change-over instruction is output from the input device, respectively; and a conversion unit that, when the signal is output from the decision unit, converts the numerical information displayed on the segment display portion into dot matrix information and displays it on the dot matrix display portion, and at the same time, reads the numerical information exceeding a predetermined character number from temporary storage and displays it on the segment display portion.

Storage of the present invention may be composed of a RAM which stores name information as character information and telephone number information as numerical information in a record of variable length.

Also, the display may be composed of a liquid crystal device in which a dot matrix display portion capable of displaying character and numerals up to 12 digits and a segment display portion capable of displaying numbers and symbols up to 12 digits are arranged on upper and lower sides.

Furthermore, the conversion unit may be composed of a shift register for increasing 4-bit information to 8-bit information and two 4-bit latches for holding the increased 8-bit information.

According to the present invention, when inputted numerical information exceeds a predetermined character number of the segment display portion or when a display change-over instruction is input after numerical information exceeding a predetermined character number as read from storage means and displayed, the numerical information already displayed on the segment display portion is then converted to dot matrix display information by the conversion unit and transferred to the dot matrix display portion. Thereafter, the input numerical information which exceeds the predetermined character number of the segment display portion or the numerical information which exceeds the predetermined character number of the segment display portion can be displayed on the segment display portion which has become an empty area due to the information transfer. With this, it is possible to display numerical information which consists of a plurality of lines in a list on the display.

According to the present invention, the dot matrix display information may be processed with an MPU of 4-bit composition. Therefore, it is possible to reduce costs of the MPU and compose the RAM with a smaller storage capacity.

Furthermore, according to the present invention, even if the input numerical information exceeds the predetermined character number of the segment display portion, the numerical information may be displayed in a list by utilizing the dot matrix display portion. Therefore, even numerical information having many digits may be input with simultaneous confirmation. Also, when numerical information is read, numerical information which is not displayed on the segment display portion may be displayed in a list by splitting the information between the dot matrix display portion and the segment display portion, respectively.

DESCRIPTION OF THE DRAWINGS

FIGS. 4 (a) thru (e) are illustration showing a display processing method in this embodiment;

DESCRIPTION OF THE PREFERRED EMBODIMENTS

Figure 1:
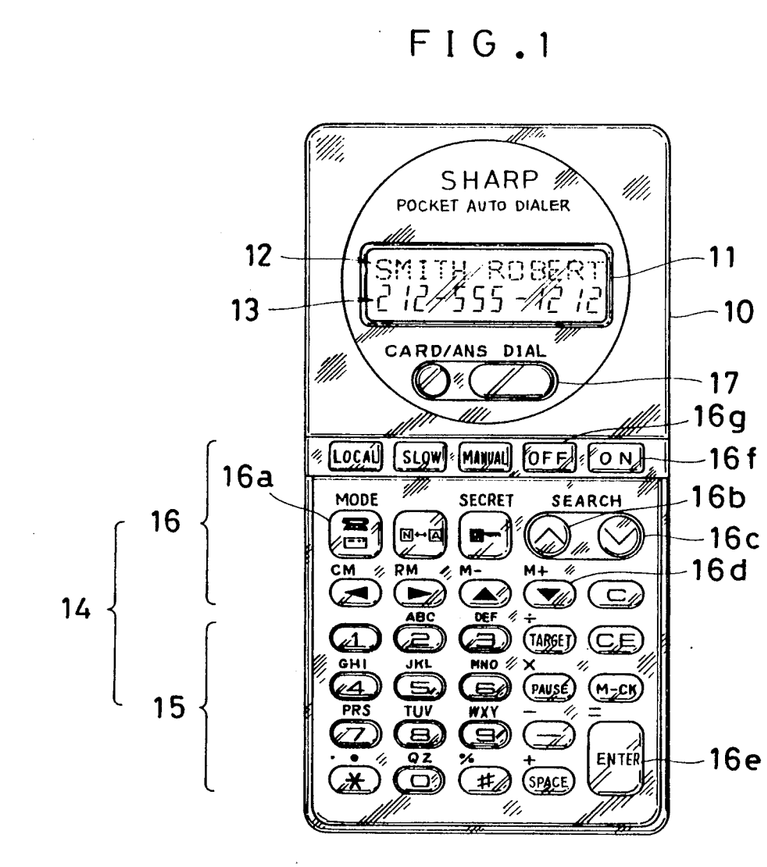
FIG. 1 is a front view of an autodialer showing an embodiment according to the present invention.
Figure 2:
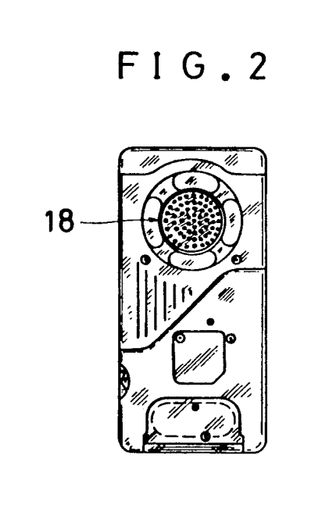
FIG. 2 is a rear view of the autodialer as shown in FIG. 1.

In FIG. 1 and FIG. 2, an autodialer is shown having a telephone directory function, a tone dialing function for making telephone calls, and a desk calculator function. These functions are selected by means of a mode switching key 16a.

In FIG. 1, the main body 10 is portable; easily carried in the palm of one's hand. An LCD 11 serves as a display. The LCD is composed of a dot matrix display portion 12 for displaying mainly character information in the alphabet (such as a name) and a segment display portion 13 for displaying mainly symbols as numerical information (such as telephone numbers). The LCD 11 may be composed of LED's. The dot matrix display portion 12 can display a character of up to 12 digits, and the segment display portion 13 is able to display a telephone number of up to 12 digits. The display of a hyphen "-"is handled as one digit in a telephone number.

Key input portion 14 is provided with alphabet keys and register keys and is composed of input keys 15 for inputting names and telephone numbers and function keys 16 for setting and selecting various instructions and various modes.

The input keys 15 function in such a manner that, in the telephone directory input mode, the character "A" may be input when key is pushed once and the character "B"may be input when the same key is pushed twice. Also, the input keys 15 function so as to input a numeral when the arithmetic mode of the desk calculator is selected.

A mode switching key 16a is used principally for switching between the telephone directory function and the desk calculator function. SEARCH keys 16b and 16c are used for recalling names and telephone numbers from storage, respectively, when the telephone directory function is used. When ⊙ key 16c is pushed, stored names are recalled alphabetically, and when ⊗ key 16b is pressed, names are recalled in the reverse alphabetical order. As well, the contents stored by the telephone directory function are stored after being automatically rearranged in alphabetical order in the main body.

Also, when the initial character of a name is input and the ⊙ key 16c or the ⊗ key 16b is pushed, it is possible to directly call the contents starting from that character in the array.

A  key 16d is used when the contents cannot be displayed all at one time on the segment display portion 13 because the display digit number of the segment display portion 13 is exceeded. An ENTER key 16e cause the system to store names and telephone numbers that are input in the telephone directory mode. A DIAL key 17 is used to access and initiate the autodial function. As well, an ON key 16f and an OFF key 16g are used when the power supply of the main body 10 is put ON or OFF, respectively.

FIG. 2 illustrates the rear of the main body including a speaker 18 mounted on the main body 10, from which a two frequency tone used as a call signal originates.

Figure 3:
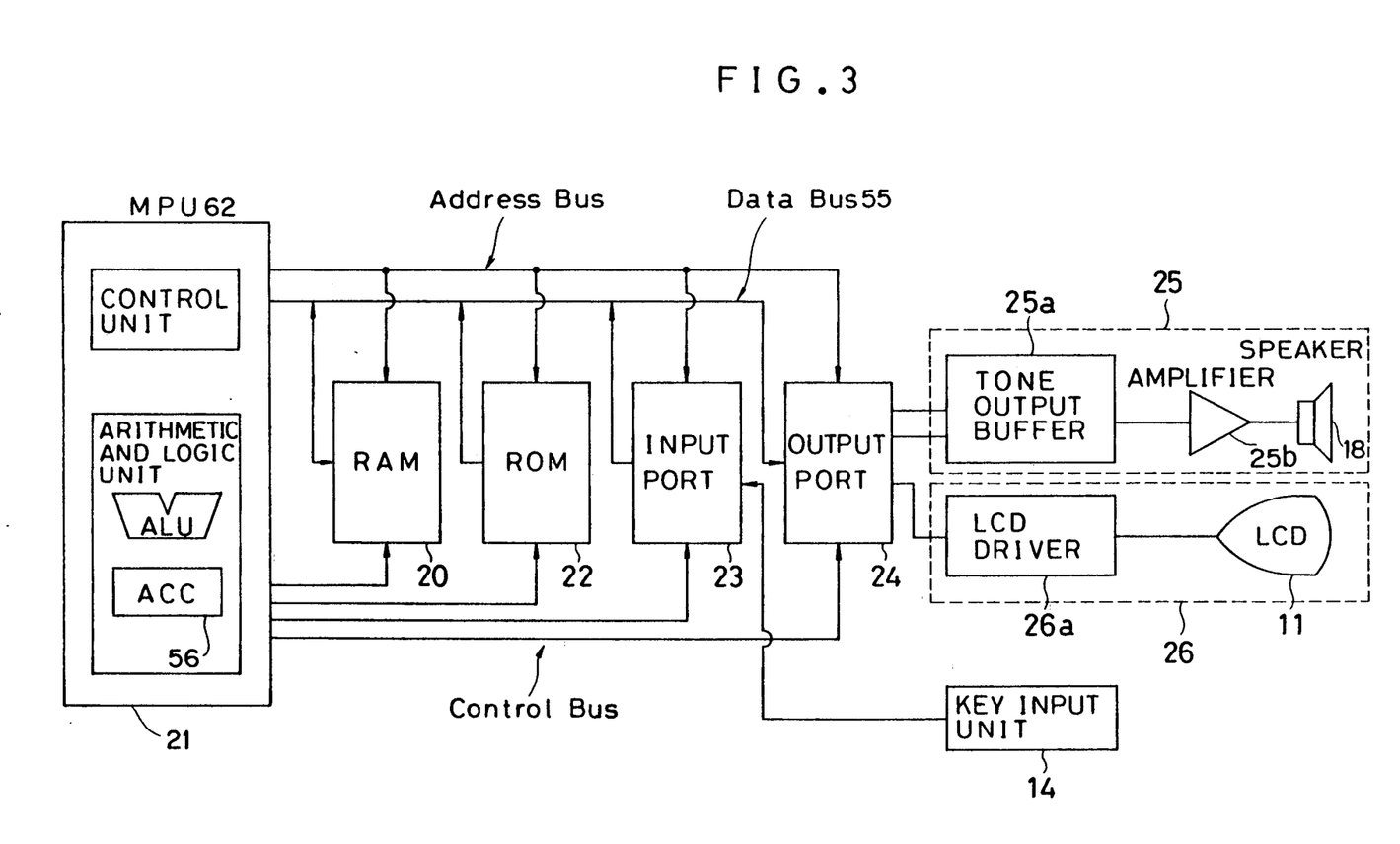
FIG. 3 is a block diagram of the autodialer shown in FIGS. 1 and 2.

FIG. 3 is a block diagram showing the composition of this embodiment. In this figure, a RAM 20 (hereafter referred to as a data buffer 20) is used as storage. The data buffer 20 is provided with both a name data buffer 71 and a telephone number data buffer for holding name data, respectively and telephone number data as they are input from the key input portion 14. Also, this data buffer 20 is provided with a dot matrix display buffer 59 and a segment display buffer 58.

An MPU 21 functions as the read/write unit, temporary storage, display control, decision unit and conversion unit and is of 4-bit composition. The functions of this MPU 21 will be explained hereinafter in the case of copying name data and telephone number data to the display buffer.

Figure 4A:
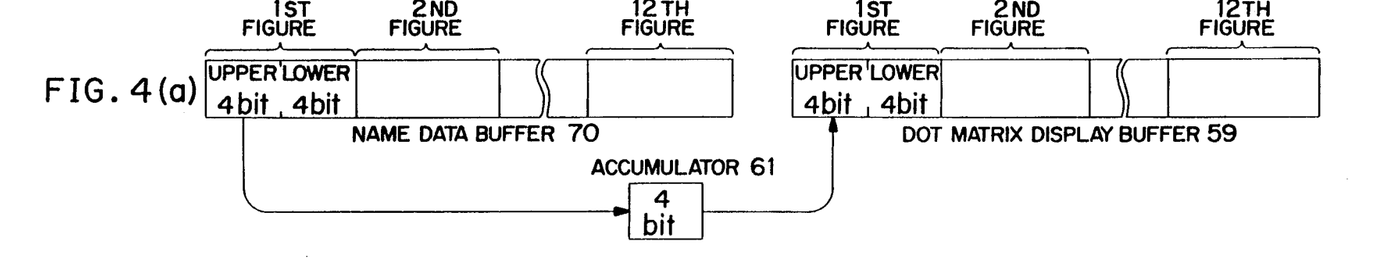
Figure 4B:
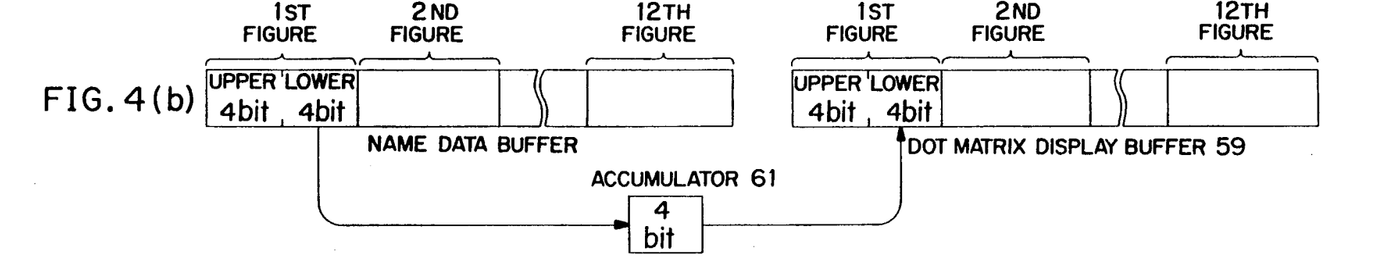

The data bus 55 of the MPU 21 is of 4 bits. One data copied from the name data buffer 70 to the dot matrix display buffer 59 is of 8 bits. Accordingly, the name data composed of these 8 bits are copied by dividing the data into two 4 bit groupings, one in the upper order and one of 4 bits in the lower order. In this case, copying is performed by means of an accumulator 56 (ACC) which is a 4-bit register. FIGS. 4 (a) and (b) show this process.

Figure 4C:
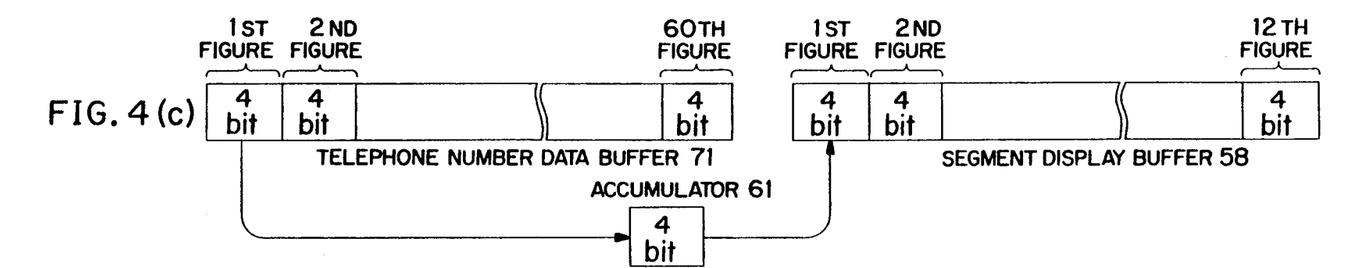

When telephone number data is copied to the segment display buffer 58, the data is processed by copying only once because one data of the telephone number data includes 4 bits. FIG. 4 (c) shows this process.

Figure 4D:
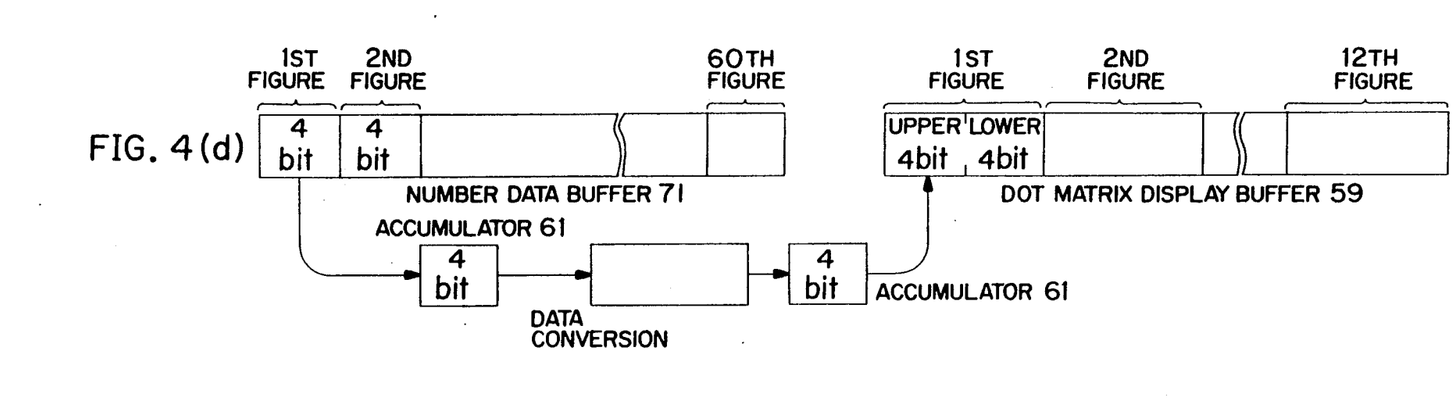
Figure 4E:
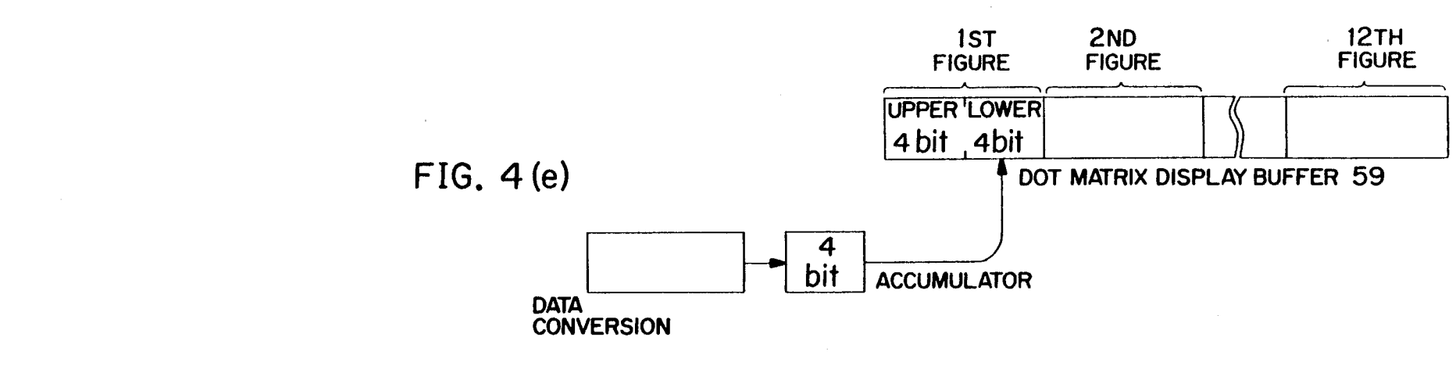

The process for copying telephone number data to the dot matrix display buffer 58 will be explained. In this case, the operation for converting telephone number data into dot matrix character data is included. First, the telephone number data is copied to the accumulator 61. Next, data conversion is performed by the accumulator 61, to create 8-bit data that corresponds to dot matrix character data. Furthermore, 4 bits in the upper order among the 8-bit data are copied to the dot matrix display buffer 59 through the accumulator 61. (See FIG. 4 (d).) Then, the remaining 4 bits in the lower order are copied to the dot matrix display buffer 59 through the accumulator 61 in a similar manner as above. (See FIG. 4 (e).)

Data conversion is performed by a data conversion circuit composed of a shift register for expanding 4-bit data to 8-bit data and two 4-bit latches for holding the converted 8-bit data.

A ROM 22 contains a program for executing the function of the MPU 21. An input port 23 and an output port 24 are connected to the MPU 21. The output port 24 is connected to an output unit 25 (forming a voice coupler) and a display unit 26. The output unit 25 is composed of a tone output buffer 25a generating a two frequency mixed tone (which serves a call signal), an amplifier 25b and a speaker 18. When the autodial function is to be used, the speaker 18 is applied to the mouthpiece of a telephone receiver and the dial key 17 is pushed. Then, the two frequency mixed tones are transmitted to the telephone line through the speaker 18, thus placing a call to the other party. Also, the display unit 26 is composed of an LCD driver 26a which generates both character and numerical information on an LCD picture plane and an LCD 11.

Figure 5:
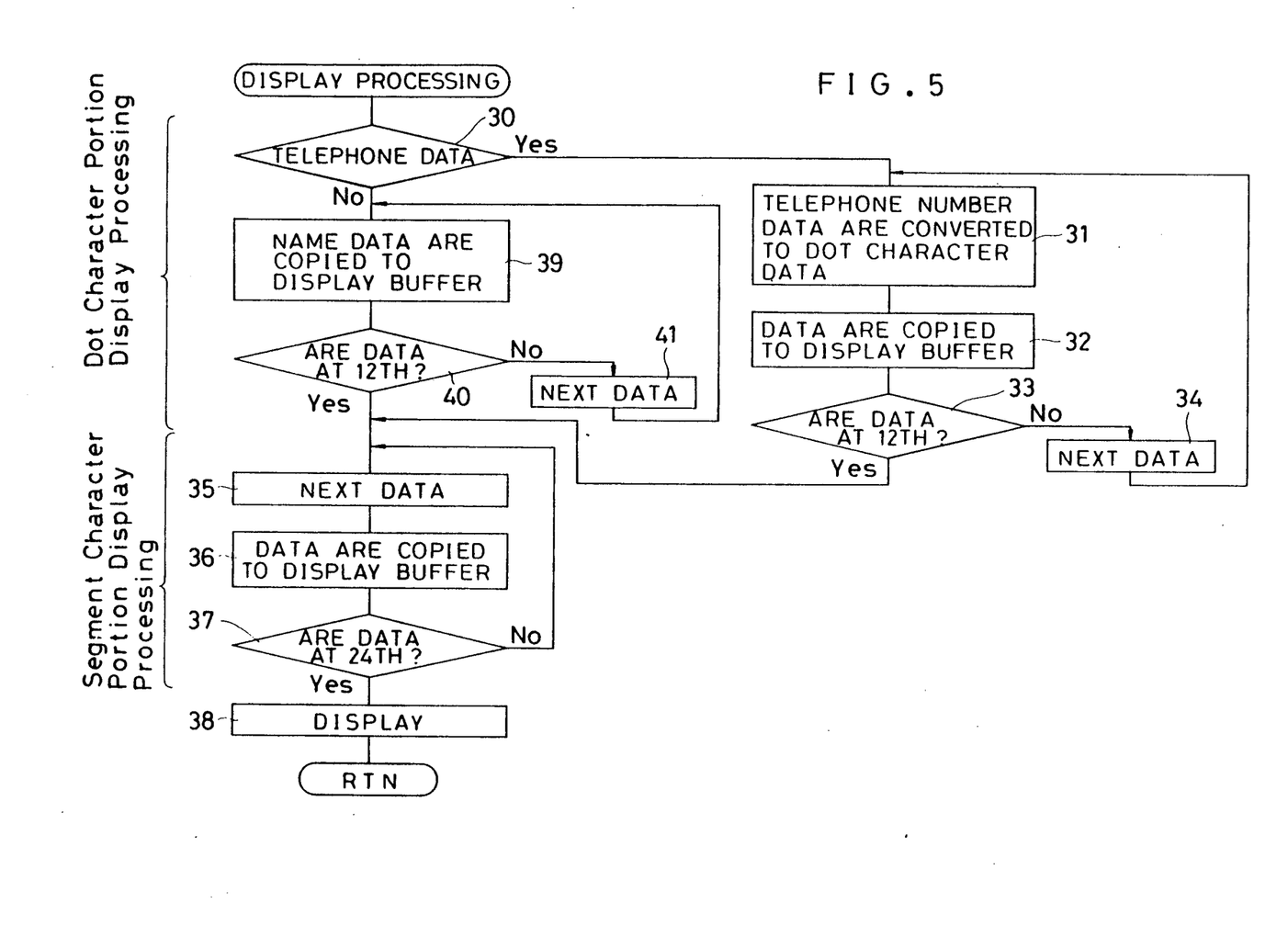
FIG. 5 is a flow chart for display processing in a preferred embodiment.

Now, MPU 21 processing will be explained with reference to the flow chart shown in FIG. 5. The data in which telephone numbers of more than 12 digits are input in the telephone number directory mode will be taken as an example. The first case to be described is where display processing does not require scrolling and the second case is where display processing does require scrolling. However, the various data structures of names and telephone numbers in the device are explained.

Data structure

As to data structure, the name data includes an 8-bit code per data for handling each alphabetic character, numeral and symbol, and the telephone number data includes a 4-bit code per data for handling numerals and symbols.

Display processing when scrolling is not applied

Display processing when scrolling is not applied is now described. It is assumed that, for example, the telephone number of Mr. Robert Smith has been registered together with his name in the data buffer RAM 20.

The telephone number of Mr. Robert Smith is recalled and displayed through the following operation.

(Operation: $\boxed{\frac{PRS}{7}} \rightarrow \boxed{\frac{PRS}{7}} \rightarrow \boxed{\blacktriangledown}$ )

Figure 6A:
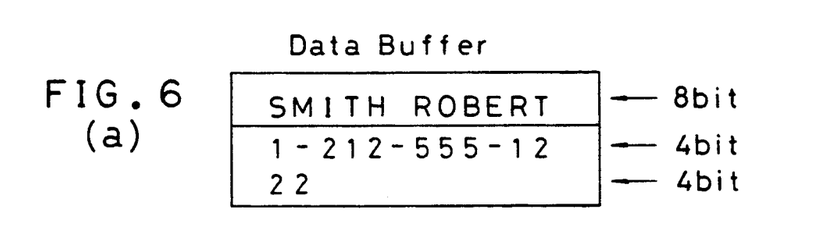
FIG. 6 illustrate display outputs of name data and telephone number data in a preferred embodiment.
Figure 6B:
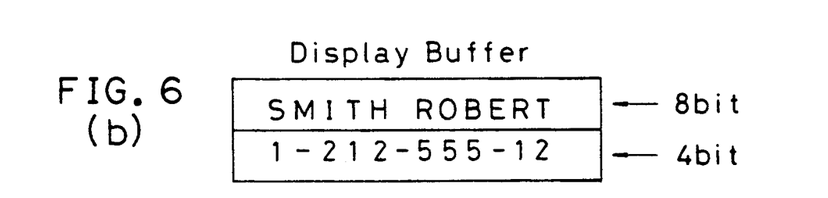
Figure 6C:
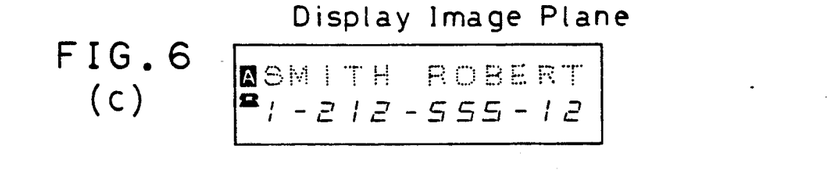

In the case of displaying data, the portion of the data buffer 20 which the MPU 21 displays is copied to the display buffer, and therefore display is based on the contents of the display buffer. Then, 12 digits of the name data are copied to the dot matrix display buffer 59. At this time, one data includes 8 bits. Next, the first 12 digits of the telephone number data are copied to the segment character display 58 buffer. At this time, one data contains 4 bits. Finally, by means of display processing, the name data and the number data are displayed on the LCD 11, respectively. FIGS. 6 (a) thru (c) show the procedure for such processing.

Display processing when scrolling is applied

Figure 7A:
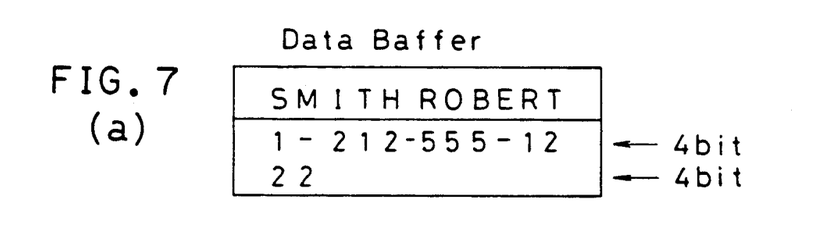
FIG. 7 shows explanatory views illustrating display processing of a list of telephone number data in the embodiment.
Figure 7B:
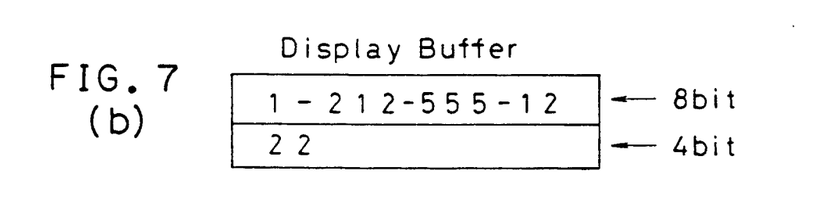
Figure 7C:
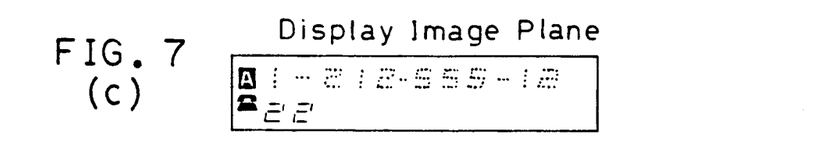

Display processing when scrolling, one of the principal features of this embodiment, will now be described. When reference to the data stored in the data buffer 20 but not displayed on the LCD 11 by pushing the key 16d, it is judged whether the telephone number data should be transferred to the dot matrix display portion 12 (step 30). It may be decided whether the name data or the telephone number data appear at the dot matrix display portion in the first column with the position indicated by a pointer by recording the pointer which shows the display range in the data buffer in advance. When it is determined that the telephone number data should appear on the dot matrix display portion, 4 bits of telephone number data are converted into 8 bits for the dot matrix display (step 31), and copied to the dot matrix display buffer (step 32). It is decided whether the data are at the 12th position in copying to the display buffer (step 33), and if the data is not at the 12th position, the next telephone number data is recalled (step 34) and returns to step 31. In step 33, when the data is at the 12th position, namely when the dot matrix display conversion of the telephone number data in the second column of the data buffer is terminated, the telephone number data in the third column of the data buffer is called (step 35) and copied to the segment display buffer (step 36). In copying to the display buffer, it can be determined whether the telephone number data is at the 24th position (step 37), and if so, it can be regarded that processing has been terminated when the telephone number data is located at the 24th position. Display processing is performed, therefore, to display the whole telephone number data by splitting into two sections, one, the dot matrix display portion 12 and the other, segment display portion 13, respectively (step 38). When the telephone number data in the third column do not fill 24 digits, "space" is inserted for the short digit number so as to make the digit length exactly 24. FIGS. 7 (a) thru (c) show the procedure for such processing.

As well, in step 30, if the telephone number data does not appear, namely if the name data appears instead, the name data is copied to the dot matrix display buffer (step 39), and it is determined whether the name data is at the 12th position (step 40). If the data is not at the 12th position, the next data is called (step 41) and processing returns to step 39, and if the data is at the 12th position, transfer is made to step 35.

Although only one embodiment of the invention has been disclosed and described, it is apparent that other embodiments and modification of the invention are possible.

What is claimed is:

1. An electronic display device with scrolling function, the device comprising:
   input means for inputting character information, numerical information and commands;
   data buffer means for storing said character and numerical information in a readable form;
   write/read means for outputting information from the input means to the data buffer means and for reading information from the data buffer means;
   display buffer means for temporarily storing information output from the write/read means, wherein said display buffer means includes a segment character display storage means for storing character information in a form for display on a segment character display and a dot matrix display storage means for storing numerical information in a form for display on a dot matrix display;
   display means for displaying said character and numerical information, stored in said display buffer means, said display means including a dot matrix display portion and a segment display portion;
   display control means for selectively converting the information stored in said display buffer means into information for display on the dot matrix display portion or segment display portion and outputting said converted information to the appropriate display portion.
   decision means for outputting a signal when numerical information stored in the dot matrix display storage means exceeds a predetermined character number, and for outputting a signal when display change-over instruction is received from said input means, respectively; and conversion means, responsive to said decision means, for converting the numerical information stored in said segment character display storage means into a format for display on said dot matrix display portion, and at the same time, converting the numerical information exceeding said predetermined character number from the buffer display means for display on the segment display portion.

2. The electronic display device according to claim 1 wherein said display means further comprising a liquid crystal display unit with a dot matrix display portion capable of displaying up to 12 characters or numerals and a segment display portion capable of displaying up to 12 characters or numerals.

3. The electronic device according to claim 1, wherein the conversion means further comprises a data conversion circuit having a shift register for increasing segment display 4-bit information to dot matrix display 8-bit information and two 4-bit latches for holding the increased 8-bit information produced by said shift register.

4. The electronic device according to claim 1, wherein the storage means further comprising a random access memory for storing character information and numerical information in records of variable length.

* * * * *